(12) United States Patent
Ahmed et al.

(10) Patent No.: US 7,657,799 B2
(45) Date of Patent: Feb. 2, 2010

(54) METHOD AND APPARATUS FOR TESTING A DUAL MODE INTERFACE

(75) Inventors: Yasser Ahmed, Macungie, PA (US); Robert Joseph Kapuschinsky, Hazleton, PA (US); Ashok Khandelwal, Breinigsville, PA (US); Samuel Khoo, Macungie, PA (US); Lane A. Smith, Easton, PA (US)

(73) Assignee: Agere Systems, Inc., Allentown, PA (US)

( * ) Notice: Subject to any disclaimer, the term of this patent is extended or adjusted under 35 U.S.C. 154(b) by 629 days.

(21) Appl. No.: 11/418,401

(22) Filed: May 4, 2006

(65) Prior Publication Data

US 2008/0010552 A1    Jan. 10, 2008

(51) Int. Cl.
*G01R 31/28* (2006.01)
(52) U.S. Cl. .................. 714/716; 714/742; 714/709; 714/824; 714/717; 714/25; 714/47; 714/48; 714/712; 370/241; 370/249; 370/251; 375/224; 702/108
(58) Field of Classification Search ............... None
See application file for complete search history.

(56) References Cited

U.S. PATENT DOCUMENTS

| | | | | |
|---|---|---|---|---|
| 6,519,544 B1 * | 2/2003 | Deguchi et al. | ............. | 702/117 |
| 6,898,721 B2 | 5/2005 | Schmidt | | |
| 7,062,754 B2 * | 6/2006 | Chang | .................. | 717/124 |
| 2001/0036227 A1 * | 11/2001 | Matsuo et al. | ............... | 375/224 |
| 2002/0056060 A1 * | 5/2002 | Saruhashi et al. | ........... | 714/712 |
| 2003/0014682 A1 | 1/2003 | Schmidt | | |
| 2005/0060471 A1 * | 3/2005 | van Engelen et al. | ....... | 710/305 |
| 2005/0117633 A1 | 6/2005 | Schmidt | | |
| 2009/0119426 A1 * | 5/2009 | Engelen et al. | ............... | 710/71 |

* cited by examiner

*Primary Examiner*—John P Trimmings
(74) *Attorney, Agent, or Firm*—Ryan, Mason & Lewis, LLP

(57) ABSTRACT

Disclosed is a system and method for testing a dual mode interface. The dual mode interface includes a first strobe circuit and a second strobe circuit configured to be inoperable during a first operational mode of the interface and operable during a second operational mode of the interface. The dual mode interface also includes a first data circuit and a second data circuit configured to be operable during the first operational mode and the second operational mode. The dual mode interface also includes a signal line connecting an output of the second strobe circuit with an input of the first strobe circuit and a switch element configured to activate said signal line in response to receipt of a test signal.

30 Claims, 5 Drawing Sheets

METHOD AND APPARATUS FOR TESTING A DUAL MODE INTERFACE

BACKGROUND OF THE INVENTION

The present invention relates generally to testing and more specifically to testing a dual mode interface, such as a bilingual 1394 firewire port.

Firewire, also known as IEEE 1394, is a personal computer and digital audio/video serial bus interface standard for high speed communications. Firewire currently supports data transfer rates up to 400 Mbps (in 1394a) and 800 Mbps (in 1394b), and the maximum data transfer rate possible with firewire 1394b is 1600 Mbps and likely to increase to 3200 Mbps. A single firewire port can typically be used to connect up to 63 external devices. In addition to its high speed, firewire also supports isochronous data—delivering data at a guaranteed rate. This makes firewire ideal for devices that need to transfer high levels of data in real-time, such as video devices.

A dual mode, or bilingual, 1394 firewire port (also referred to below as a bilingual firewire port) can operate in two different modes corresponding to the two different data rates described above. Specifically, a bilingual firewire port can operate at both speeds—1394a and 1394b—depending on the application. When the bilingual firewire port operates at the slower data transfer rates of 100, 200, or 400 Mbps, the bilingual firewire port operates in a "legacy mode". When the bilingual firewire port operates at the higher data transfer rate of 800 Mbps, the bilingual firewire port operates in a "beta mode". There is typically a method to set the bilingual firewire port to a particular mode, such as by causing a particular pin of the firewire port to have a voltage greater than a predetermined value for one mode and less than the predetermined value for the other mode. The voltage is set by control logic or an external signal.

One problem is that it is difficult to test the firewire port at its normal beta mode operating speed(s). Automated test equipment used in a non-invasive fashion (i.e., testing the firewire port using an external device not inserted onto the firewire port circuit itself) cannot normally communicate at the fast data rates of a beta mode firewire port. Further, the interface between the test equipment and the firewire port can introduce parasitic loading on the high-speed firewire port, thereby degrading performance. Therefore, firewire ports are traditionally tested using automated test equipment that communicates at a lower data rate relative to the firewire's beta mode operating data rates to determine that the firewire port is functional. This testing, however, does not test the firewire port for proper operation at the maximum data rates.

Another method of testing a bilingual firewire port is in an invasive fashion in which test circuitry is inserted onto the circuit board of the firewire port itself during manufacturing testing of the firewire port. For example, test circuitry may be inserted on input/output data lines of the firewire port to analyze the data being transmitted/received by the firewire port. This technique, however, is undesirable because it adds parasitic loading on the firewire port and can alter the operation of the components.

Therefore, there remains a need to enable testing of a bilingual firewire port at the maximum speed which the bilingual firewire port operates and in a non-invasive fashion.

BRIEF SUMMARY OF THE INVENTION

The present invention provides for non-invasive testing of a dual mode interface at the interface's maximum data rate. The testing of the interface at its maximum data rate is typically enough to warrant that the dual mode interface can also operate at its lower data rate(s).

In accordance with the principles of the present invention, a dual mode interface includes a first strobe circuit and a second strobe circuit configured to be inoperable during a first operational mode of the interface and operable during a second operational mode of the interface. The dual mode interface also includes a first data circuit and a second data circuit configured to be operable during the first operational mode and the second operational mode. The dual mode interface also includes a signal line connecting an output of the second strobe circuit with an input of the first strobe circuit and a switch element configured to activate the signal line in response to receipt of a test signal.

In one embodiment, the second strobe circuit of the dual mode interface includes an AND gate whose output activates the signal line. The AND gate has a first input that is activated when the dual mode interface operates in the first operational mode and a second input as the switch element.

In one embodiment, the second data circuit includes an input for receiving input data transmitted at a rate corresponding to a rate associated with the first operational mode of the dual mode interface. The first data circuit can include an output for transmitting output data in response to the second data circuit receiving the input data. The dual mode interface also includes data lines enabling communications between the first strobe circuit and the first data circuit and data lines enabling communications between the second data circuit and the second strobe circuit.

In one embodiment, the dual mode interface is a bilingual firewire port where the first operational mode is a beta mode and the second operational mode is a legacy mode.

In operation, the dual mode interface receives a test signal and input data at an input of the second data circuit, and transmits the input data from the second data circuit to the second strobe circuit. The input data is transmitted over the signal line to the first strobe circuit in response to the test signal. Output data is then transmitted over the signal line to an output of the first data circuit.

The input data is also transmitted from the first strobe circuit to the first data circuit. In one embodiment, the dual mode interface receives a first operational mode signal so that the dual mode interface operates in its first operational mode (e.g., its beta mode).

In one embodiment, the output data is compared with the input data. If the output data is equal to the input data, then the dual mode interface is operating correctly. If the dual mode interface is operating incorrectly, the output data is unequal to the input data.

These and other advantages of the invention will be apparent to those of ordinary skill in the art by reference to the following detailed description and the accompanying drawings.

DETAILED DESCRIPTION

Figure 1:
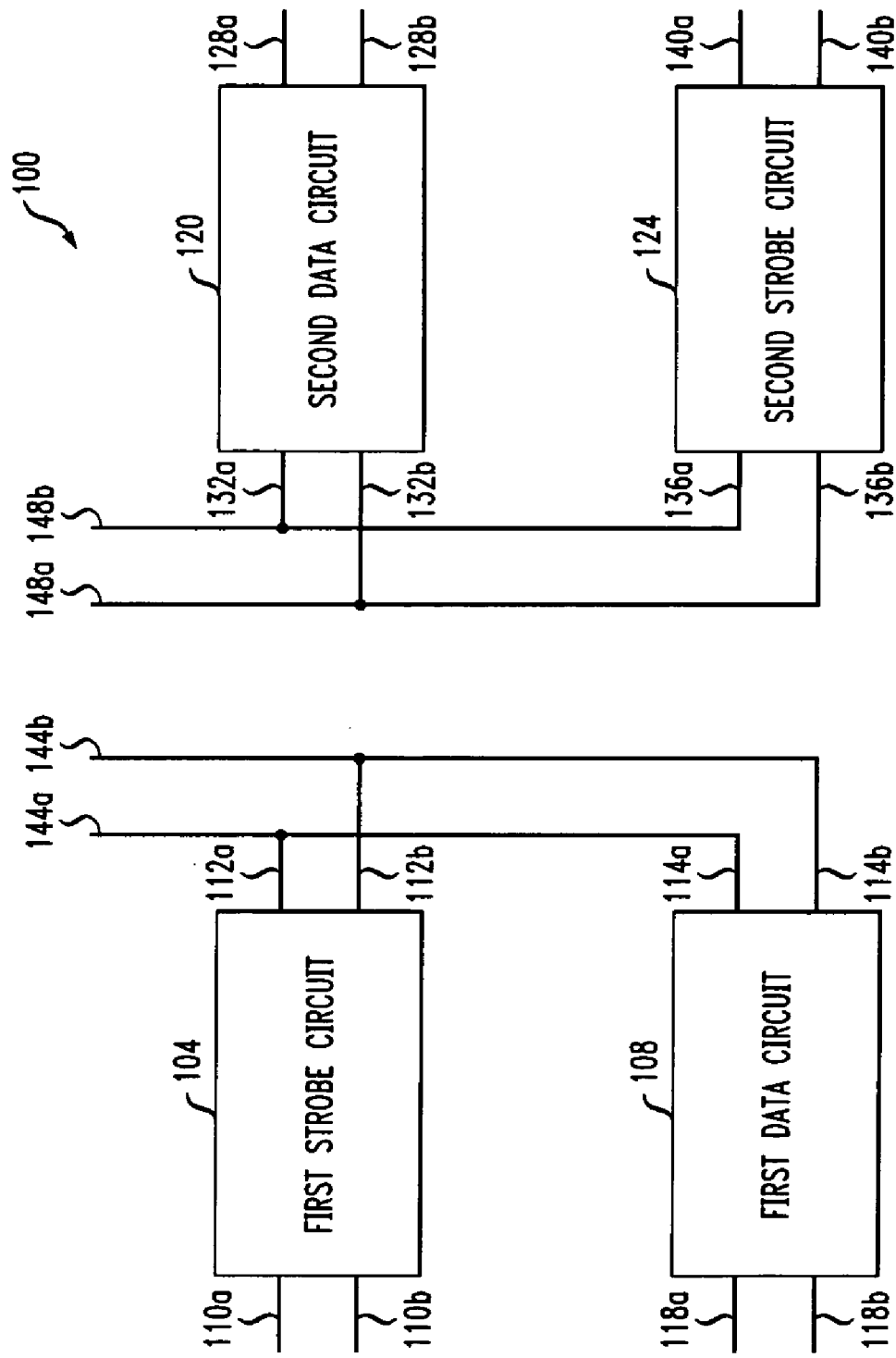
FIG. 1 is a block diagram of a bilingual 1394 firewire port.

FIG. 1 shows a block diagram of an embodiment of a bilingual 1394 firewire port 100. As described above, the firewire port 100 can operate in a legacy mode or a beta mode.

The bilingual firewire port 100 typically includes a first strobe circuit 104 in communication with a first data circuit 108. The first strobe circuit 104 includes two inputs 110a, 110b and two outputs 112a, 112b. The first data circuit 108 includes two inputs 114a, 114b and two outputs 118a, 118b.

The bilingual firewire port 100 also includes a second data circuit 120 and a second strobe circuit 124. The second data circuit 120 includes two inputs 128a, 128b and two outputs 132a, 132b. The second strobe circuit 124 also includes two inputs 136a, 136b and two outputs 140a, 140b.

Data is communicated out of and into the firewire port 100 via data lines 144a, 144b, 148a, 148b. In particular, the first strobe circuit's outputs 112a, 112b transmit a strobe (i.e., clock) over a first pair of data lines 144a, 144b to the first data circuit's inputs 114a, 114b while the second data circuit's outputs 132a, 132b transmit data over a second pair of data lines 148a, 148b to the second strobe circuit's inputs 136a, 136b. Further, data can be input/output from/to an external device in communication with the firewire port 100, such as a computer, via one or more of the data lines 144a, 144b, 148a, 148b.

When operating in the legacy mode, the bilingual firewire port 100 has both transmitters (i.e., the first strobe circuit 104 and the second data circuit 120) operating at the same time or both receivers (i.e., the first data circuit 108 and the second strobe circuit 124) operating at the same time. If both transmitters are operating at the same time, then the first transmitter (i.e., the first strobe circuit 104) traditionally transmits a strobe (i.e., clock) and the other transmitter (i.e., the second data circuit 120) traditionally transmits data. When the receivers (i.e., the first data circuit 108 and the second strobe circuit 124) are operating, one receiver (i.e., the first data circuit 108) receives the strobe (from the first strobe circuit 104) and the other receiver (i.e., the second strobe circuit 124) receives data from the second data circuit 120. The transmission or generation of a clock signal in the legacy mode enables the firewire port 100 to operate in legacy mode without requiring use of a clock and data recovery (CDR) circuit.

When operating in beta mode, however, a CDR circuit is employed to generate a clock from the data. As a result, only the first and second data circuits 108, 120 are operable to transmit or receive data. The inoperable strobe circuits 104, 124 are not being used during the beta mode and are therefore idle.

Figure 2:
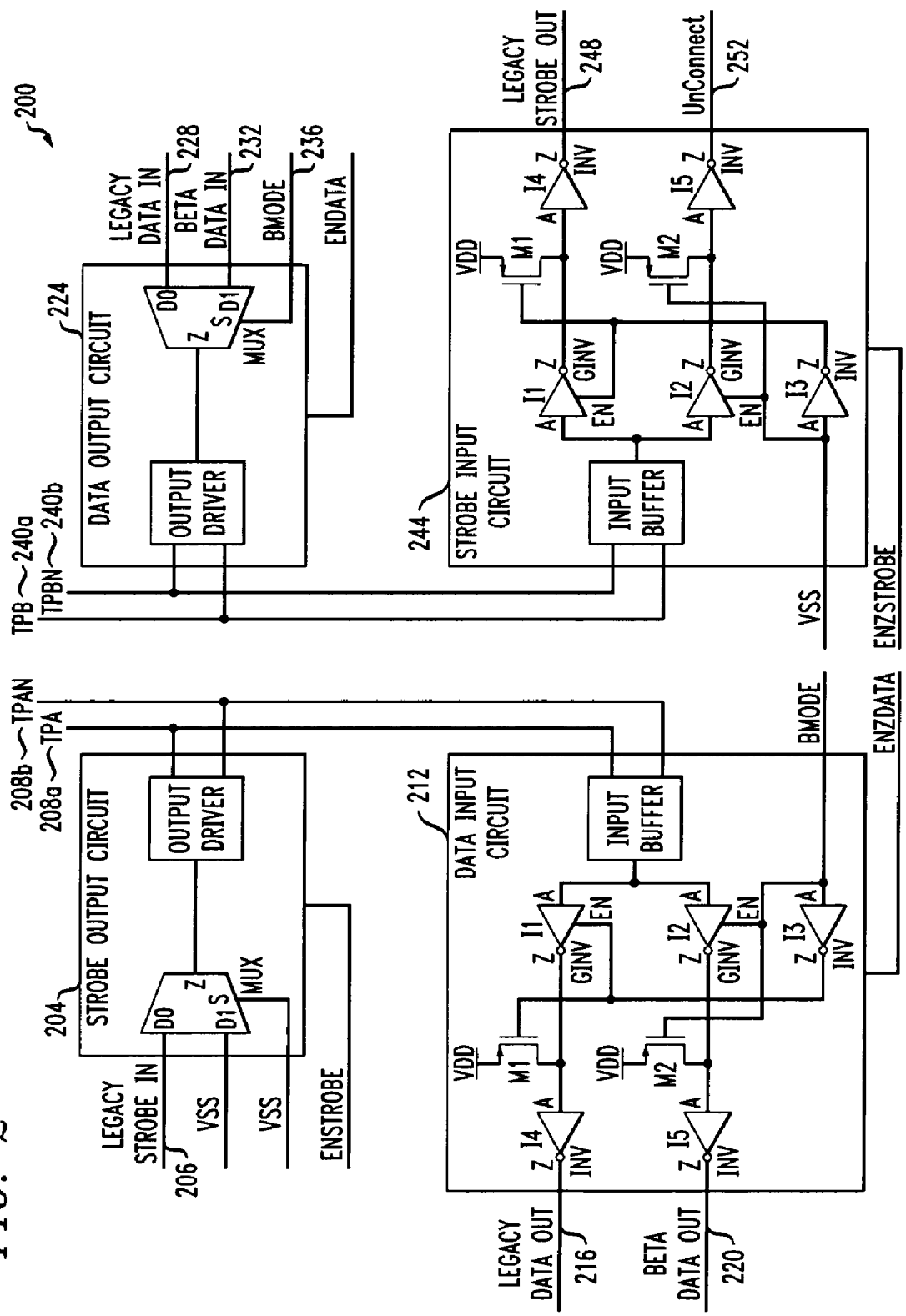
FIG. 2 is a more detailed block diagram of a bilingual 1394 firewire port.

FIG. 2 shows a more detailed block diagram of an embodiment of a bilingual firewire port 200. The bilingual firewire port 200 includes a strobe output circuit 204 that provides a clock signal when the bilingual firewire port 200 operates in legacy mode. The strobe output circuit 204 is connected to TPA and TPAN twisted pair data lines 208a, 208b. The strobe output circuit 204 includes a legacy strobe input pin 206 for receiving a clock signal. When the bilingual firewire port 200 operates in beta mode, the strobe output circuit 204 (and, for example, its input pins) are unused.

A data input circuit 212 receives the data from data lines 208a, 208b and includes a legacy data output pin 216 and a beta data output pin 220. When the bilingual firewire port 200 operates in legacy mode, the output data is transmitted over the legacy data output pin 216. When the bilingual firewire port 200 operates in beta mode, the output data is transmitted over the beta data output pin 220.

The bilingual firewire port 200 also includes a data output circuit 224. The data output circuit 224 has the same design and components as the strobe output circuit 204 (e.g., the same number of input and output pins). The data output circuit 224 has a legacy data input pin 228 and a beta data input pin 232. These pins 228, 232 are the input pins for the different modes. The data output circuit 224 also includes a BMODE pin 236. The BMODE pin 236 is set to high when the bilingual firewire port 200 operates in beta mode and is set to low when the bilingual firewire port 200 operates in legacy mode. The BMODE pin 236 is typically set by control logic or an external test signal. The output of the data output circuit 224 is transmitted over TPB and TPBN twisted pair data lines 240a, 240b (generally 240).

The data transmitted by the data output circuit 224 is available to be received by a strobe input circuit 244. The strobe input circuit 244 has the same receiver design and components as the data input circuit 212. As a result, the strobe input circuit 244 has two output pins 248, 252. The strobe input circuit 244 provides a clock signal when the bilingual firewire port 200 operates in legacy mode. The strobe input circuit 244 includes legacy strobe output pin 248 for transmitting the clock signal as output. The second output pin 252 of the strobe input circuit 244 is unused and unconnected because the strobe input circuit 244 is used to transmit the clock signal (which occurs on the legacy strobe output pin 248) during operation in legacy mode.

Figure 3:
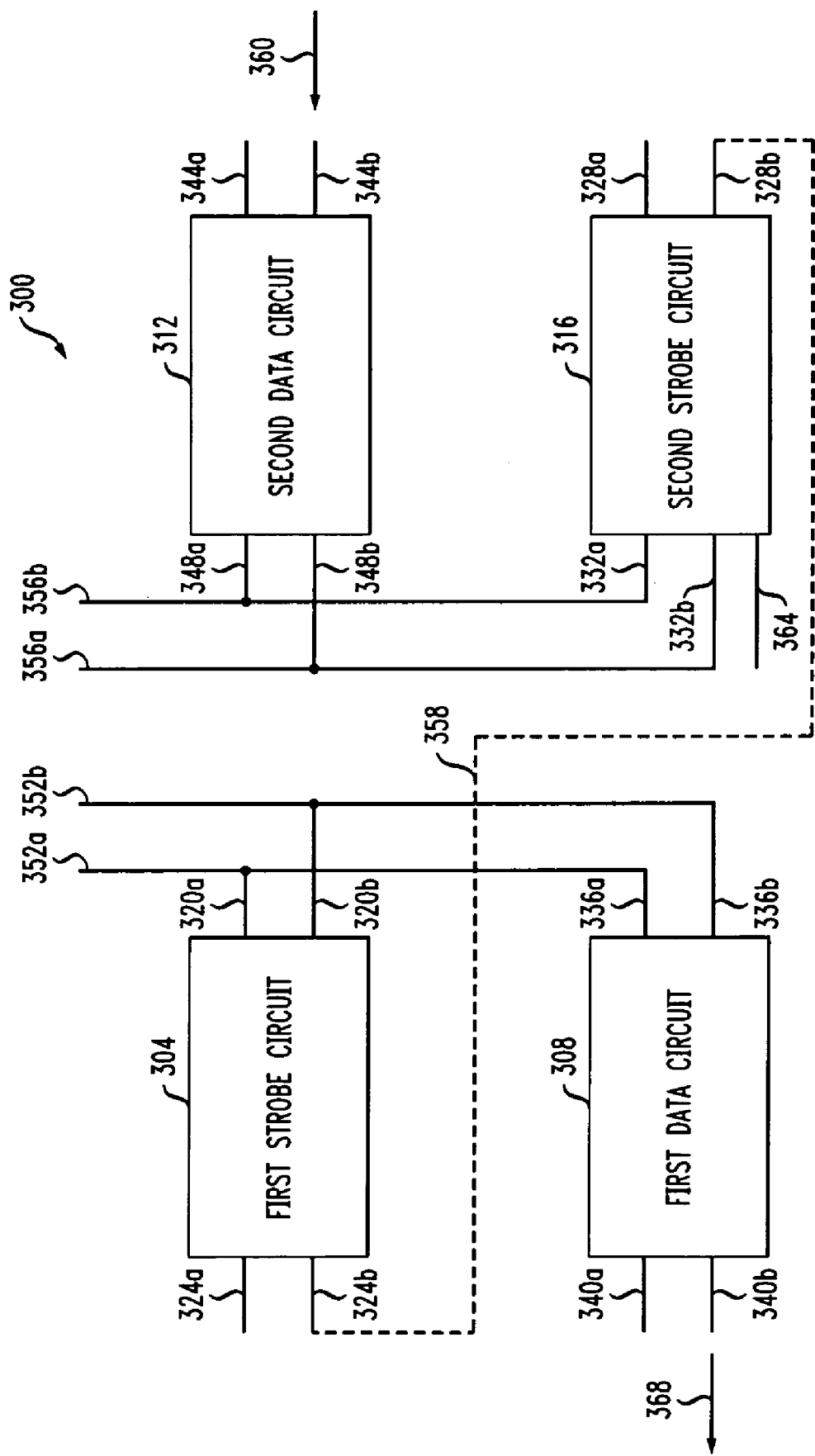
FIG. 3 shows a block diagram of a dual mode interface in accordance with an embodiment of the invention.

FIG. 3 shows a block diagram of a dual mode interface 300 in accordance with an embodiment of the invention. Dual mode interface 300 includes first strobe circuit 304 in communication with a first data circuit 308 and a second data circuit 312 in communication with a second strobe circuit 316. The first strobe circuit 304 has two outputs 320a, 320b and two inputs 324a, 324b and the second strobe circuit 316 has two outputs 328a, 328b and two inputs 332a, 332b. Similarly, the first data circuit 308 has two inputs 336a, 336b and two outputs 340a, 340b and the second data circuit 312 has two inputs 344a, 344b and two outputs 348a, 348b. The outputs 320a, 320b of the first strobe circuit 304 and the inputs 336a, 336b of the first data circuit 308 are connected to respective data lines 352a, 352b. Similarly, the outputs 348a, 348b of the second data circuit 312 and the inputs 332a, 332b of the second strobe circuit 316 are connected to respective data lines 356a, 356b.

As described above, the first strobe circuit 304 is not used by (i.e., inoperable) the dual mode interface 300 when operating in beta mode because no strobe (i.e., clock) is needed from the first strobe circuit 304. Thus, the inputs 324a, 324b of the first strobe circuit 304 are typically unused (i.e., inoperable) when the dual mode interface 300 operates in its first operational mode (e.g., its beta mode).

As described above, the second strobe circuit 316 is not used by the dual mode interface 300 when operating in its first operational mode (e.g., beta mode) because no strobe (i.e., clock) is needed from the second strobe circuit 316. Thus, the outputs 328a, 328b of the second strobe circuit 316 are typically unused when the dual mode interface 300 operates in beta mode.

In accordance with an embodiment of the present invention, output 328b of the second strobe circuit 316 (typically unused when the dual mode interface 300 operates in its first operational mode) is connected to input 324b of the first strobe circuit 304 (also typically unused when the dual mode interface 300 operates in its first operational mode), thereby providing a loopback connection for the dual mode interface 300. This connection is shown with dashed signal line 358. This signal line (also referred to below as a loopback connection) 358 enables non-invasive testing of the dual mode interface 300 at its maximum operating speed (when operating in the first operational mode).

Figure 4:
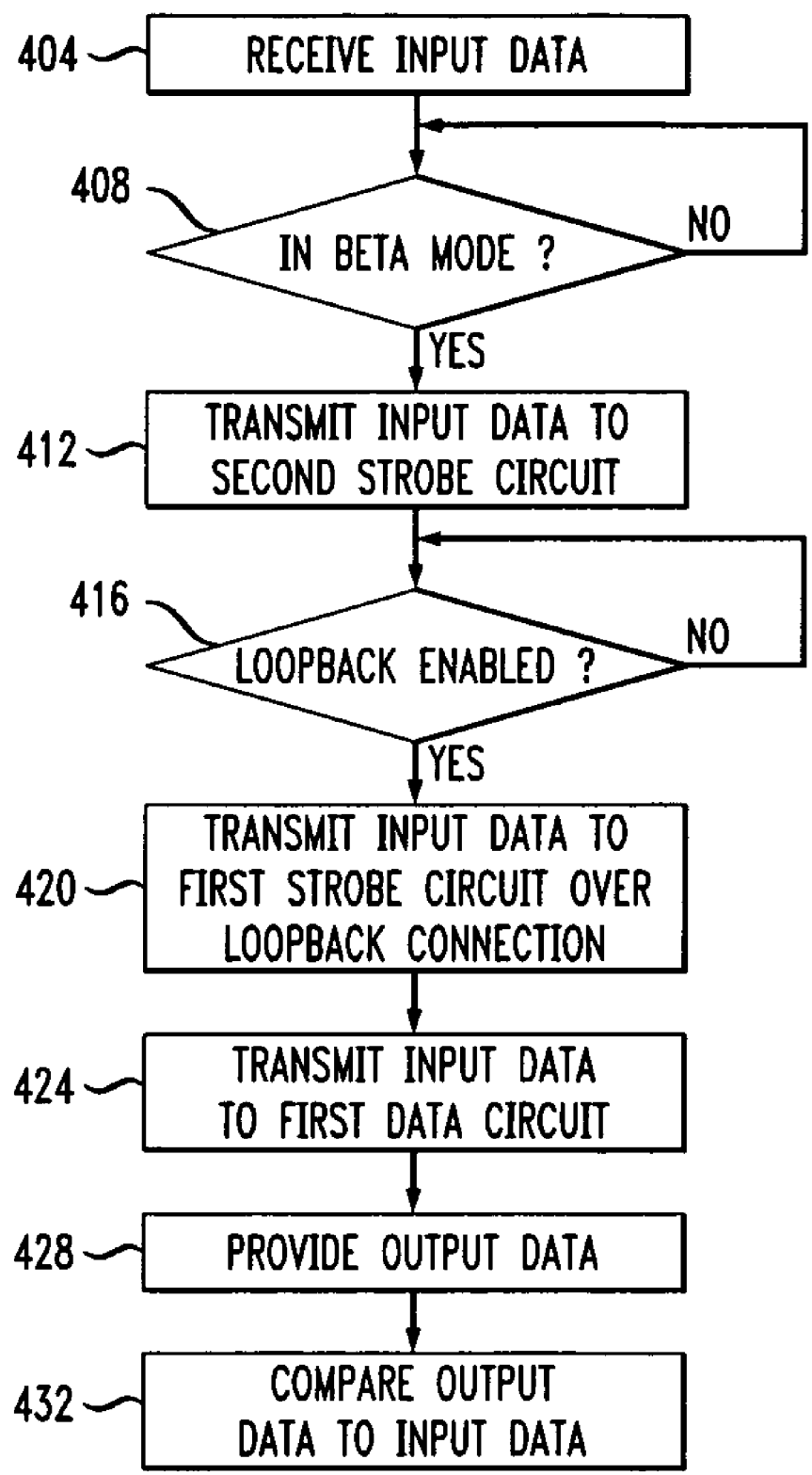
FIG. 4 shows a flowchart of the steps performed by a dual mode interface when receiving a test signal in accordance with an embodiment of the invention.

FIG. 4 shows a flowchart of the steps performed by the dual mode interface 300 when receiving input test data in accordance with an embodiment of the invention. Input 344b of the second data circuit 312 receives input data 360 in step 404. Input data 360 is data transmitted at a data rate associated with the first operational mode data rate. The data may be a single bit, multiple bits, or a data stream. In one embodiment, a CDR circuit receives a parallel input at a low data rate (relative to the maximum data rate of the dual mode interface operating in its first operational mode) and converts it to a serial data stream transmitted at the data rate associated with the first operational mode.

The dual mode interface 300 then determines whether it is operating in its first operational mode (e.g., beta mode) in step 408. If the dual mode interface 300 is not operating in beta mode, the test pauses until the dual mode interface 300 receives input to switch it to beta mode. In one embodiment, the dual mode interface 300 operates in beta mode when a particular pin is set high.

Once in beta mode, the second data circuit 312 transmits the input data 360 over the data line 356a and to the second strobe circuit 316. The second strobe circuit 316 then determines whether loopback is enabled in step 416. The second strobe circuit 316 performs this analysis by determining whether a loopback enabling pin, or switch element, 364 is set high (i.e., the voltage associated with the pin 364 is above a predetermined value). If the pin 364 is not set high, then the second strobe circuit 316 waits until the pin 364 is set high.

Once the loopback enabling pin 364 is set high, the second strobe circuit 316 transmits the input data 360 over the loopback connection 358 to the input 324b of the first strobe circuit 304 in step 420. The first strobe circuit 304 receives the input data 360 and sends it out over the data lines 352a, 352b in step 424. The first data circuit 308 receives the input data 360 from the data lines 352a, 352b and transmits output data 368 in step 428. The output data 368 is then compared in step 432 with the input data 360 that was transmitted to the second data circuit 312. In one embodiment, if the two signals are the same, then the dual mode interface 300 is operating correctly and has been tested at its maximum beta mode speed. If the signals do not match, then there may be a problem with the dual mode interface 300.

Figure 5:
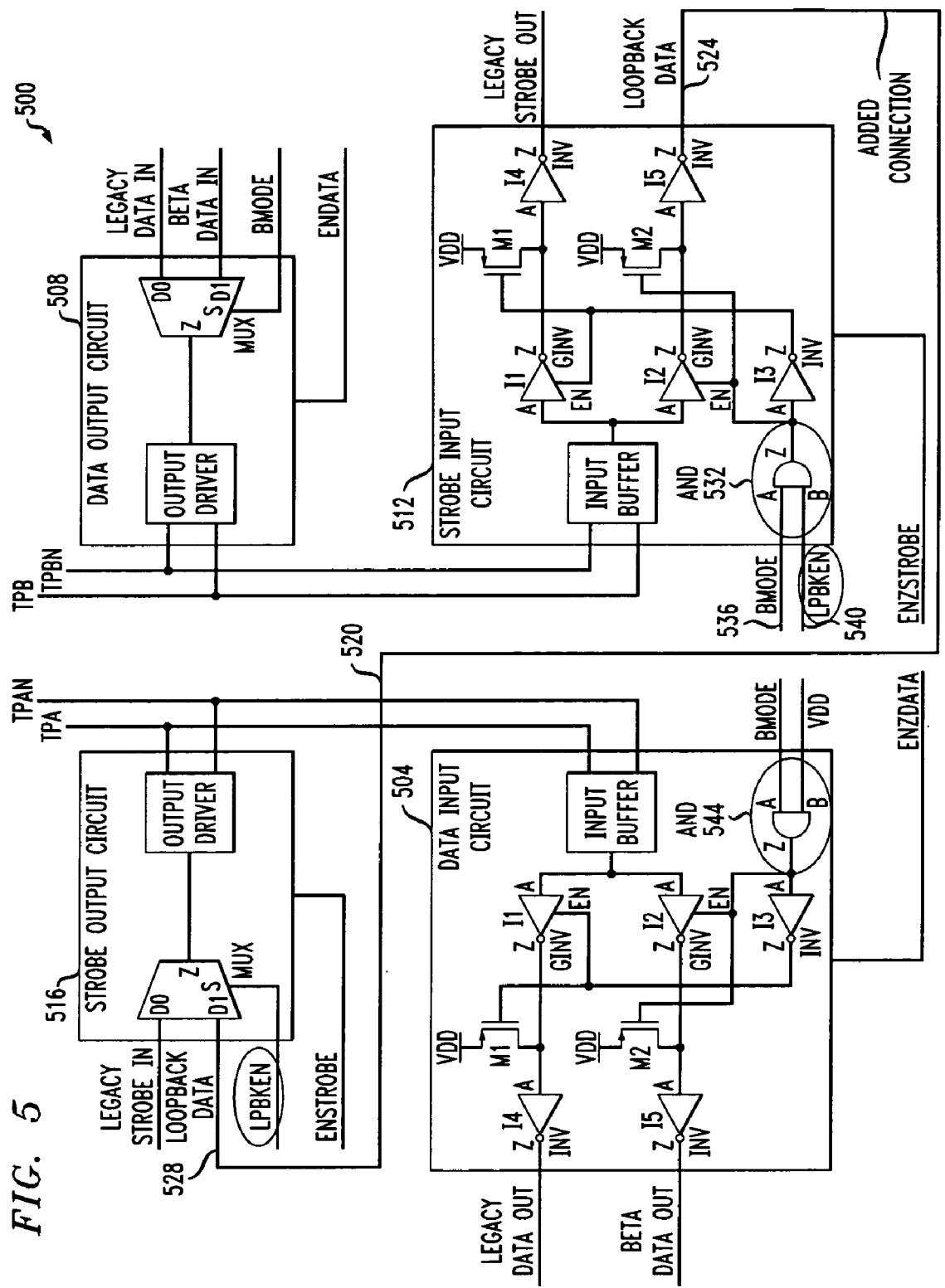
FIG. 5 is a more detailed block diagram of a dual mode interface in accordance with an embodiment of the invention.

FIG. 5 is a more detailed block diagram of a dual mode interface 500. The dual mode interface 500 includes a data input circuit 504, a data output circuit 508, a strobe input circuit 512, and a strobe output circuit 516. The dual mode interface 500 also includes a loopback connection 520 connecting an output 524 of the strobe input circuit 512 with an input 528 of the strobe output circuit 516.

In one embodiment, an AND gate 532 is added to the strobe input circuit 512. The AND gate 532 includes a BMODE input 536 and a LPBKEN input 540. The BMODE input 536 is set high to put the dual mode interface 500 in the first operational mode (e.g., beta mode). Thus, the loopback connection 520 is not active unless the dual mode interface 500 is operating in the first operational mode. The loopback connection 520 is also not activated until the dual mode interface 500 is put into a test mode. The dual mode interface 500 can only operate in the test mode when the dual mode interface 500 is put into the first operational mode. The test mode is triggered by setting the LPBKEN input pin 540 high using a test signal. Once this pin 540 is set high, the signal line 520 is enabled to transmit data between the strobe input circuit 512 and the strobe output circuit 516 when the dual mode interface 500 is operating in the first operational mode.

In one embodiment, AND gate 544 is added to the data input circuit 504 so that the two input circuits 504, 512 are mirrored. This mirroring often facilitates consistent and faster manufacturing because the components and layouts are the same for the two input circuits 504, 512. Further, with the same components and layout, both input circuits 504, 512 will typically provide consistent timing when receiving an input and transmitting an output while operating in legacy mode.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A dual mode interface having at least a first operational mode and a second operational mode, said dual mode interface comprising:
   a first strobe circuit and a second strobe circuit;
   a signal line connecting an output of said second strobe circuit with an input of said first strobe circuit; and
   a switch element configured to activate said signal line in response to receipt of a test signal;
   wherein said first strobe circuit and said second strobe circuit are configured to be operable during said second operational mode of said dual mode interface; and
   wherein said first strobe circuit and said second strobe circuit are configured to be inoperable during said first operational mode of said dual mode interface other than during activation of said signal line.

2. The dual mode interface of claim 1 further comprising a first data circuit and a second data circuit configured to be operable during said first operational mode and said second operational mode.

3. The dual mode interface of claim 2 wherein said second data circuit comprises an input for receiving input data transmitted at a rate corresponding to a rate associated with said first operational mode of said dual mode interface.

4. The dual mode interface of claim 3 wherein said first data circuit further comprises an output for transmitting output data in response to said second data circuit receiving said input data.

5. The dual mode interface of claim 2 further comprising data lines enabling communications between said first strobe circuit and said first data circuit.

6. The dual mode interface of claim 2 further comprising data lines enabling communications between said second data circuit and said second strobe circuit.

7. The dual mode interface of claim 1 wherein said second strobe circuit further comprises an AND gate comprising an output that activates said signal line.

8. The dual mode interface of claim 7 wherein said AND gate comprises a first input that is activated when said dual mode interface operates in said first operational mode.

9. The dual mode interface of claim 8 wherein said switch element is a second input of said AND gate.

10. The dual mode interface of claim 1 wherein said dual mode interface is a bilingual firewire port.

11. The dual mode interface of claim 1 wherein said first operational mode communicates data at a rate of approximately 800 Mbps and said second operational mode communicates data at a rate of approximately 400 Mbps.

12. A method for testing a dual mode interface having at least a first operational mode and a second operational mode, said interface comprising a first strobe circuit and a second strobe circuit and a first data circuit and a second data circuit, the method comprising:
  receiving a test signal;
  receiving input data at an input of said second data circuit;
  transmitting said input data from said second data circuit to said second strobe circuit;
  transmitting said input data over a signal line to said first strobe circuit in response to said test signal, said signal line connecting an output of said second strobe circuit with an input of said first strobe circuit; and
  transmitting output data to an output of said first data circuit;
  wherein said first strobe circuit and said second strobe circuit are configured to be operable during said second operational mode of said dual mode interface; and
  wherein said first strobe circuit and said second strobe circuit are configured to be inoperable during said first operational mode of said dual mode interface other than during activation of said signal line.

13. The method of claim 12 further comprising comparing said output data with said input data.

14. The method of claim 13 further comprising determining that said dual mode interface is operating correctly when said output data is equal to said input data.

15. The method of claim 13 further comprising determining that said dual mode interface is operating incorrectly when said output data is unequal to said input data.

16. The method of claim 12 further comprising transmitting said input data from said first strobe circuit to said first data circuit.

17. The method of claim 12 further comprising receiving a first operational mode signal so that said dual mode interface operates in said first operational mode.

18. A method for testing a dual mode interface having at least a first operational mode and a second operational mode, said dual mode interface comprising a first strobe circuit and a second strobe circuit and a first data circuit and a second data circuit, the method comprising:
  transmitting input data to an input of said second data circuit;
  transmitting a test signal;
  transmitting said input data from said second data circuit to said second strobe circuit;
  transmitting said input data over a signal line to said first strobe circuit in response to said test signal, said signal line connecting an output of said second strobe circuit with an input of said first strobe circuit;
  transmitting output data to an output of said first data circuit; and
  comparing said output data with said input data to determine whether said dual mode interface is operating correctly;
  wherein said first strobe circuit and said second strobe circuit are configured to be operable during said second operational mode of said dual mode interface; and
  wherein said first strobe circuit and said second strobe circuit are configured to be inoperable during said first operational mode of said dual mode interface other than during activation of said signal line.

19. The method of claim 18 wherein said comparing step further comprises determining that said dual mode interface is operating correctly when said output data is equal to said input data.

20. The method of claim 18 wherein said comparing step further comprises determining that said dual mode interface is operating incorrectly when said output data is unequal to said input data.

21. The method of claim 18 further comprising transmitting said input data from said first strobe circuit to said first data circuit.

22. The method of claim 18 further comprising receiving a first operational mode signal so that said dual mode interface operates in said first operational mode.

23. A dual mode interface having at least a first operational mode and a second operational mode, said interface comprising a first strobe circuit and a second strobe circuit and a first data circuit and a second data circuit, the dual mode interface comprising:
  means for receiving a test signal;
  means for receiving input data at an input of said second data circuit;
  means for transmitting said input data from said second data circuit to said second strobe circuit;
  means for transmitting said input data over a signal line to said first strobe circuit in response to said test signal, said signal line connecting an output of said second strobe circuit with an input of said first strobe circuit; and
  means for transmitting output data to an output of said first data circuit;
  wherein said first strobe circuit and said second strobe circuit are configured to be operable during said second operational mode of said dual mode interface; and
  wherein said first strobe circuit and said second strobe circuit are configured to be inoperable during said first operational mode of said dual mode interface other than during activation of said signal line.

24. The dual mode interface of claim 23 wherein said output data is compared with said input data.

25. The dual mode interface of claim 23 wherein correct operation is determined when said output data is equal to said input data.

26. The dual mode interface of claim 23 wherein incorrect operation is determined when said output data is unequal to said input data.

27. The dual mode interface of claim 23 further comprising means for transmitting said input data from said first strobe circuit to said first data circuit.

28. The dual mode interface of claim 23 further comprising means for receiving a first operational mode signal so that said dual mode interface operates in said first operational mode.

29. A dual mode interface comprising:
  a first data circuit operable during a first operational mode and a second operational mode of said dual mode interface;
  a second data circuit operable during said first operational mode and said second operational mode;
  a first strobe circuit configured to communicate with said first data circuit during said first operational mode;
  a second strobe circuit configured to communicate with said second data circuit during said first operational mode;
  a signal line connecting an output of said second strobe circuit with an input of said first strobe circuit; and
  a switch element configured to activate said signal line in response to receipt of a test signal during said first operational mode;

wherein said first strobe circuit and said second strobe circuit are configured to be operable during said second operational mode; and wherein said first strobe circuit and said second strobe circuit are configured to be inoperable during said first operational mode other than during activation of said signal line.

30. The dual mode interface of claim 29 wherein said first strobe circuit and said second strobe circuit are idle during said first operational mode in absence of said receipt of a test signal.

* * * * *